United States Patent [19]

Shenoi et al.

[11] Patent Number: 5,148,426
[45] Date of Patent: Sep. 15, 1992

[54] INTEGRATED ECHO CANCELING MULTIPLEXOR

[75] Inventors: Kishan Shenoi, Milpitas; Paul P. Yang, Cupertino; Terrence G. Sopira, Mountainview, all of Calif.

[73] Assignee: DSC Communications Corporation, Plano, Tex.

[21] Appl. No.: 535,123

[22] Filed: Jun. 8, 1990

[51] Int. Cl.[5] .............................................. H04J 3/00
[52] U.S. Cl. .................................. 370/32.1; 370/85.1
[58] Field of Search ............ 370/32.1, 32, 112, 85.1; 375/8; 379/406, 410

[56] References Cited

U.S. PATENT DOCUMENTS

| | | | |
|---|---|---|---|
| 4,644,108 | 2/1987 | Crouse et al. | 379/406 |
| 4,924,492 | 5/1990 | Gitlin et al. | 370/32.1 |
| 4,991,167 | 2/1991 | Petri et al. | 379/406 |
| 5,029,167 | 7/1991 | Arnon et al. | 379/410 |
| 5,043,976 | 8/1991 | Abiven et al. | 379/410 |

Primary Examiner—Douglas W. Olms
Assistant Examiner—Min Jung
Attorney, Agent, or Firm—Baker & Botts

[57] ABSTRACT

An integrated echo canceling multiplexor is provided which comprises an echo canceler for receiving DS1 signals for canceling echo in the DS1 signal and producing an echo-free digital logic signal. A first performance monitor is coupled to the echo canceler for receiving the echo-free digital logic signal and determining the quality of the signal. A multiplexor-demultiplexor is further coupled to the echo canceler for receiving the echo-free digital logic signal and producing a DS3 signal. Additionally, a second performance monitor is coupled to the multiplexor-demultiplexor and receives the DS3 signal and determines the quality of the signal.

16 Claims, 2 Drawing Sheets

1

INTEGRATED ECHO CANCELING MULTIPLEXOR

TECHNICAL FIELD OF THE INVENTION

This invention relates in general to the field of telecommunications, and more particularly to an integrated echo canceling multiplexor.

BACKGROUND OF THE INVENTION

In the environment of a Telephone Central Office, voice and digital data are received from nearby telephone service subscribers and processed before transmission over a transmission medium to distant telephone subscribers. Similarly, voice and digital data are also received from distant telephone subscribers and processed before delivering the data to the nearby subscriber. For obvious reasons, the nearby subscriber is commonly called "near side," and the distant subscriber is commonly called "far side" or "long haul" by those in the telecommunication industry. Presently, near side data is received in DS1, and data is transmitted on the DS3 level. By convention, DS1 is composed of 24 DS0 channels, and DS3 is composed of 28 DS1 lines.

The data processing which takes place inside the Telephone Central Office includes echo canceling, DS1-to-DS3 multiplexing and performance monitoring. Presently, each function is performed by a separate piece of equipment, typically called an echo canceler, a multiplexor and a performance monitor. The three pieces of equipment are physically installed in separate mounting racks possibly in different parts of the Telephone Central Office. In addition, each piece of equipment also requires a separate power supply and a video display terminal.

Referring to FIG. 1, a block diagram illustrating the conventional setup is shown. An echo canceler 10 and its control module 12 are coupled to the near side via a cable which is coupled to a DSX-1 (Digital Signal Cross-Connect-1) 16 on a patch panel. DSX-1 16 is a location where jumper wires are used to "patch" together two cables carrying DS1 level signals. Echo canceler 10 further receives and sends control information to a Central Office computer and also produces an alarm in the event of abnormal operations. Echo canceler 10 is coupled to a performance monitor 18 and its control module 20 via cables 22 and another DSX-1 24. Typically, cables 22 may have a combined length of 100-200 feet. Performance monitor 18 is also coupled to a Central Office computer and additionally produces an alarm indicative of faulty operations.

Performance monitor 18 is further coupled to a M13 multiplex-demultiplexor (Ml3 muldem) 26 and its control module 28 via cables 30 which are patched together at a DSX-1 32 on the patch panel. Similarly, it is not uncommon for cables 30 to have a total length of 100-200 feet. M13 muldem 26 also sends and receives control information to and from the Central Office computer. Additionally, M13 muldem 26 is also capable of generating an alarm in the event of faulty operations. M13 muldem 26 is coupled to the far side via a cable 34 and a DSX-3 36, which transmits DS3 level signals.

Echo canceler 10, performance monitor 18 and M13 muldem 26 are all commercially available. For example, a commercially available echo canceler EC7600-M2 is manufactured by DSC Communications Corporation. Performance monitoring at the DS0 level may be implemented with Network Characterization System (NCS) manufactured by DSC Communications Corporation or Monitor 2400 manufactured by Compression Telecommunication. DS1 level performance monitoring may be performed by Network Channel Office Equipment (NCOE) manufactured by Tautron, which is a subsidiary of General Signal Corporation. DS1-to-DS3 multiplex-demultiplexors are available from DSC Communications Corporation under the name TM45000 and many other manufacturers.

The setup as shown in FIG. 1 is prone to errors due to the cabling and patching between the three components. For example, misplacement of the jumper wires that patch two cables together and incorrect cable installation can cause errors. Furthermore, bit errors may be caused by electromagnetic interference on the long cables and cables which are not terminated properly. The cables may not be terminated properly due to improper impedance matching in the DSX or failure to provide the correct line buildout network (not shown) for the length of the cable used. With the increasing number of telephone service subscribers, more consideration must be given to the amount of space required to house the equipment and the availability of DSX ports along with the overall power consumption and cost of the equipment.

Furthermore, the Performance Monitoring equipment 18 is usually used to monitor DS1 level parameters on both sides of the device. When used in conjunction with echo canceler 10 as shown in FIG. the DS! signal being monitored on the echo canceler side is purely intra-office and the monitoring is thus not so valuable. On the other side, the DS1 signal that is monitored is part of the facility, albeit embedded in a DS3, and monitoring does provide significant value. Therefore, it is desirable to provide for an apparatus which can monitor the DS1 signals including the embedded DS1 signal in the DS3, the equivalent of the signal carried in cables 30, and the DS1 signal carried in cables 14.

In the system shown in FIG. 1, separate control ports and alarm ports are required for each piece of equipment. Furthermore, as each piece of equipment is coupled to a separate operator interface in the form of a video display terminal, an operator must be familiar with three different command languages and three sets of screen layouts in order to communicate with all three pieces of equipment. This adds to the complexity of the system needlessly, and is likely to create confusion for the operator.

Therefore, it is desirable to provide a more compact system which performs the echo canceling, performance monitoring and M13 multiplexing-demultiplexing tasks and yet eliminates possible errors arising from having interconnecting cables.

SUMMARY OF THE INVENTION

In accordance with the present invention, an integrated echo canceling multiplexor is provided which substantially eliminates or reduces disadvantages and problems associated with prior systems.

In one aspect of the present invention, an integrated echo canceling multiplexor is provided which comprises an echo canceling circuit for receiving DS1 signals for canceling echoes in the DS1 signal and producing an echo-free digital logic signal. A first performance monitoring circuit is coupled to the echo canceling circuit for receiving the echo-free digital logic signal and determining the quality of the signal. A multiplex-demultiplexing circuit is further coupled to the echo canceling circuit for receiving the echo-free digital logic signal and producing a DS3 signal. Additionally, a second performance monitoring circuit is coupled to the multiplex-demultiplexing circuit and receives the DS3 signal and determines the quality of the signal.

In another aspect of the present invention, an integrated echo canceling multiplexor comprises a first multiplex-demultiplexing circuit for receiving DS3 signals and converting the DS3 signals to DS1 signals, the DS1 signal being in the form of digital logic signals. An echo canceling circuit is coupled to the first multiplex-demultiplexing circuit for receiving the DS1 digital logic signal and producing an echo-free DS1 digital logic signal. Coupled to the echo canceling circuit is a second multiplex-demultiplexing circuit for receiving the echo-free digital logic signal and producing DS3 signals for transmission.

In yet another aspect of the present invention, an integrated echo canceling multiplexor is provided. A first multiplex-demultiplexing circuit receives DS3 signals and converts the DS3 signals to DS1 signals. An echo canceling circuit is coupled to the first multiplex-demultiplexing circuit, receives the DS1 digital logic signal and produces an echo-free DS1 digital logic signal. A second multiplex-demultiplexing circuit is further coupled to the echo canceling circuit for receiving the echo-free digital logic signal and producing DS3 signals for transmission. Additionally, a first performance monitoring circuit is coupled to the first multiplex-demultiplexing circuit for receiving the DS1 digital logic signals and determining the quality of the DS1 signal. A second performance monitoring circuit is coupled to the echo canceling circuit for receiving the echo-free DS1 digital logic signal and determining the quality of the echo-free DS1 signal. The DS3 signal received by the first multiplex-demultiplexing circuit is monitored by a third performance monitoring circuit integrally coupled to the first multiplex-demultiplexing circuit. The DS3 signal produced by the second multiplex-demultiplexing circuit is monitored by a fourth performance monitoring circuit integrally coupled to the second multiplex-demultiplexing circuit. Finally, a fifth performance monitoring circuit integrally coupled to the echo canceling circuit determines the quality of the DS1 signal at the DS0 level.

Important technical advantages of the present invention are the elimination of errors associated with the interconnecting cables, and savings in terms of cost, space, power consumption, DSX ports, etc.

In eliminating the interconnecting cables, considerable cost savings are realized, since the cost of the cables could exceed the cost of the three components they interconnect. In addition, substantial savings in power consumption, space, DSX ports also results from the incorporation of the integrated echo canceling multiplexor of the present invention.

Another important technical advantage of the present invention arises from combining the echo canceler, performance monitor and M13 muldem in one integrated system. In prior implementations, as shown in FIG. 1, each of the components must possess the capability to receive a DS1 signal, then detect and demarcate the frames in the DS1 signal. In addition, circuitry is required to convert the DS1 signal to standard digital logic signals such as TTL or CMOS at the receiving port and convert the digital logic signals back to DS1 at the sending port. In the integrated system, the DS1 signal is received and converted only once to digital logic signal levels and reconverted to the DS1 or DS3 level only once. Thus, considerable circuitry is eliminated.

Yet another important advantage arises from the integration of the control modules into one. Although the integrated controller also must control the functions of the echo canceler, performance monitor and M13 muldem, it requires only one database in which control information such as DS1 framing format, including D4 or ESF (Extended Super Frame), and line code, either AMI (Alternate Mark Inversion) or B8ZS (bipolar with 8 zero substitution), is stored. Furthermore, changing the parameter of any one piece of equipment, for example the DS! framing format, is automatically reflected in the others, since the database and controller are shared by the three integrated components.

Additionally, since the DS1 signal on the cables may be encoded in either AMI or B8ZS, the databases in the control modules must also maintain what encoding algorithm is currently in use. By eliminating the interconnecting cables, such data are no longer needed.

Another important advantage provided by the present invention allows a single operator video terminal interface for all three components. The operator is required to know only one command language and one set of interface screens to communicate with all components of the integrated system. Therefore, the operator may gain expertise more quickly and function more proficiently.

BRIEF DESCRIPTION OF THE DRAWINGS

For a better understanding of the present invention, reference may be made to the accompanying drawings, in which.

DETAILED DESCRIPTION OF THE INVENTION

Figure 2:
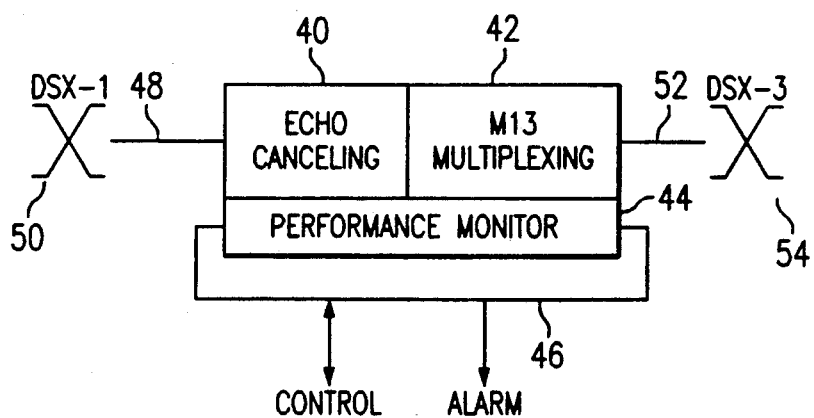
FIG. 2 is a block diagram of the present invention.

With reference to the drawings, FIG. 2 illustrates an embodiment of the present invention. An echo canceling circuit 40 of the type EC7600-M2 manufactured by DSC Communications Corporation is packaged to be accommodated on another printed circuit board. Echo canceling circuitry 40 is coupled to a M13 multiplexing circuit 42 like TM45000 manufactured by DSC Communications Corporation. Similarly, M13 multiplexing circuit 42 is accommodated on another printed circuit board. Performance monitoring circuit 44 on the DS0 level like Network Characterization System (NCS) manufactured by DSC Communications Corporation or Monitor 2400 manufactured by Compression Telecommunication is integrated into the echo canceling printed circuit board. Such commercially available DS0 level performance monitors generally determines the quality of the DS1 signal by computing the noise, signal power and echo levels for each DS0 channel. A performance monitoring circuit such as Network Channel Office Equipment (NCOE) manufactured by Tautron for DS1 level performance monitoring is integrated into the echo canceling printed circuit board.

The DS1 performance monitoring includes computing the bit-error rate, framing-bit errors, and slips, and maintaining suitable statistical reports to reflect these parameters. NCOE devices universally adhere to the Extended Super Frame (ESF) framing format that provides a Cyclic-Redundance-Check (CRC) over all information bits in a super-frame which allows the receiver to determine whether bit-errors occurred in transmission. These statistical reports are maintained in 1-second, 15-minute, 24-hour, and cumulative manners. The statistical parameters kept are "error-free seconds", "errored-seconds" and "severely-errored-seconds" and derivatives thereof. Definition of these terms is given in AT&T PUB 54016.

Figure 1:
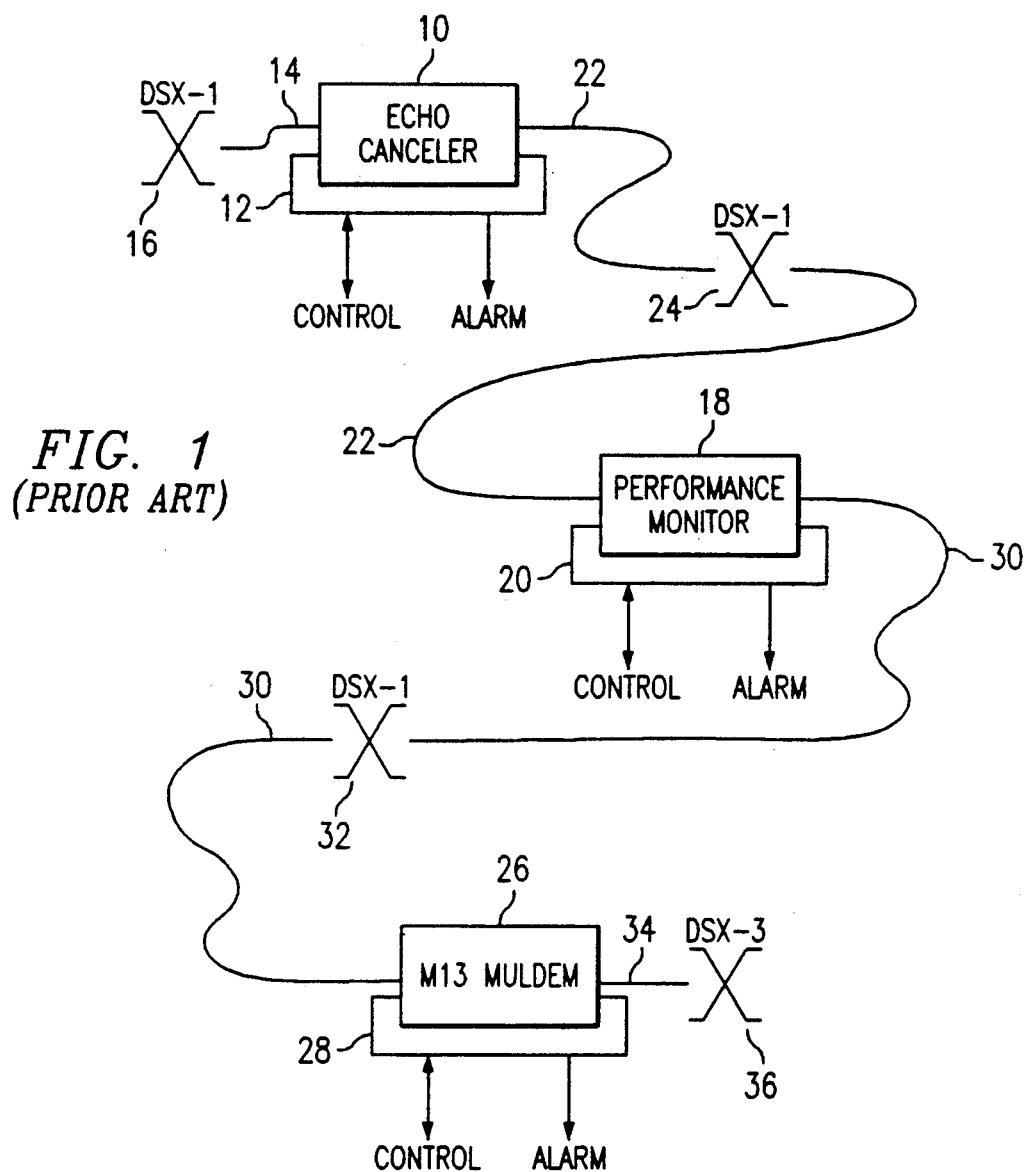
FIG. 1 is a block diagram of a prior system.

In addition to DS0 and DS1 level performance monitoring, the signal quality at the DS3 level is also monitored. DS3 level performance monitoring includes computing the bit error rate based on bipolar violations, out-of-frame events, parity errors, and C-bit errors at the DS3 level. Although such error checking schemes are known in the art, DS3 performance monitoring such as described above are not available commercially. This is due to the fact that in prior systems, such as shown in FIG. 1, the data signals are relayed through the three pieces of equipment at the DS1 level. Therefore, DS3 level signals are simply not available to performance monitor 18. Integrated echo canceling multiplexor possesses the added error checking ability to detect faults at the DS3 level. In implementation, DS3 level performance monitoring will be in firmware and reside on the M13 multiplexing printed circuit board.

The functionalities of echo canceling circuit 40, M13 multiplexing circuit 42 and performance monitoring circuit 44 are controlled by a controller 46. The manner in which controller 46 exerts control over each of the circuits is like that of control modules 12, 20 and 28 and therefore will not be discussed in detail herein. Controller 46 also serves as a database manager, operator interface manager, Central Office computer interface manager, report generating manager and alarm processing manager for the integrated system.

Figure 3:
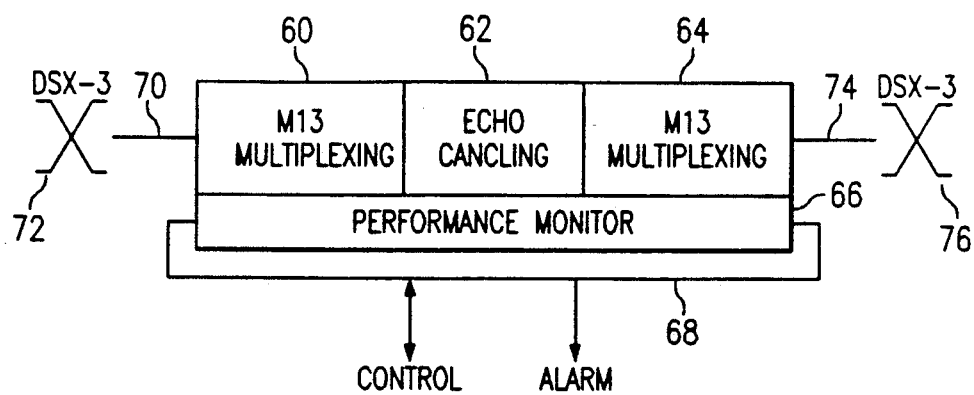
FIG. 3 is a block diagram of the preferred embodiment of the present invention.

Referring to FIG. 3, a preferred embodiment of the present invention is shown, where signals on both the near and far side of an echo canceler are DS3 level interconnections. An M13 demultiplexing circuit 60 is coupled to an echo canceling circuit 62, which is also coupled to an M13 multiplexing circuit 64. In implementation, circuits 60 and 64 may be replicates of the same function. A performance monitoring circuit 66 like that of circuit 44 monitors the signal quality on the DS0, DS1 and DS3 levels. Similarly, a controller 68 performs functions like that of controller 46.

Therefore, the circuitry required to process the signals on one DS1 channel are accommodated on two printed circuit boards, which communicate with one another via a blackplane. A significant beneficial result of this is that data signals are now relayed through echo canceling circuit 40, M13 multiplexing circuit 42 and performance monitoring circuit 44 at TTL or CMOS logic levels rather than bipolar DS1 levels. Once the data signals enter the integrated echo canceling multiplexor, they remain at digital logic levels until they have been processed and are ready for transmission. Thus no conversion between digital logic levels and DS! bipolar signals and vice versa are required. Additionally, whereas all three components are constrained by predetermined frequency requirements such as 1.544 Mb/s for DS1, the integrated echo canceling multiplexor operates at the rate of an internal clock.

Figure 4:
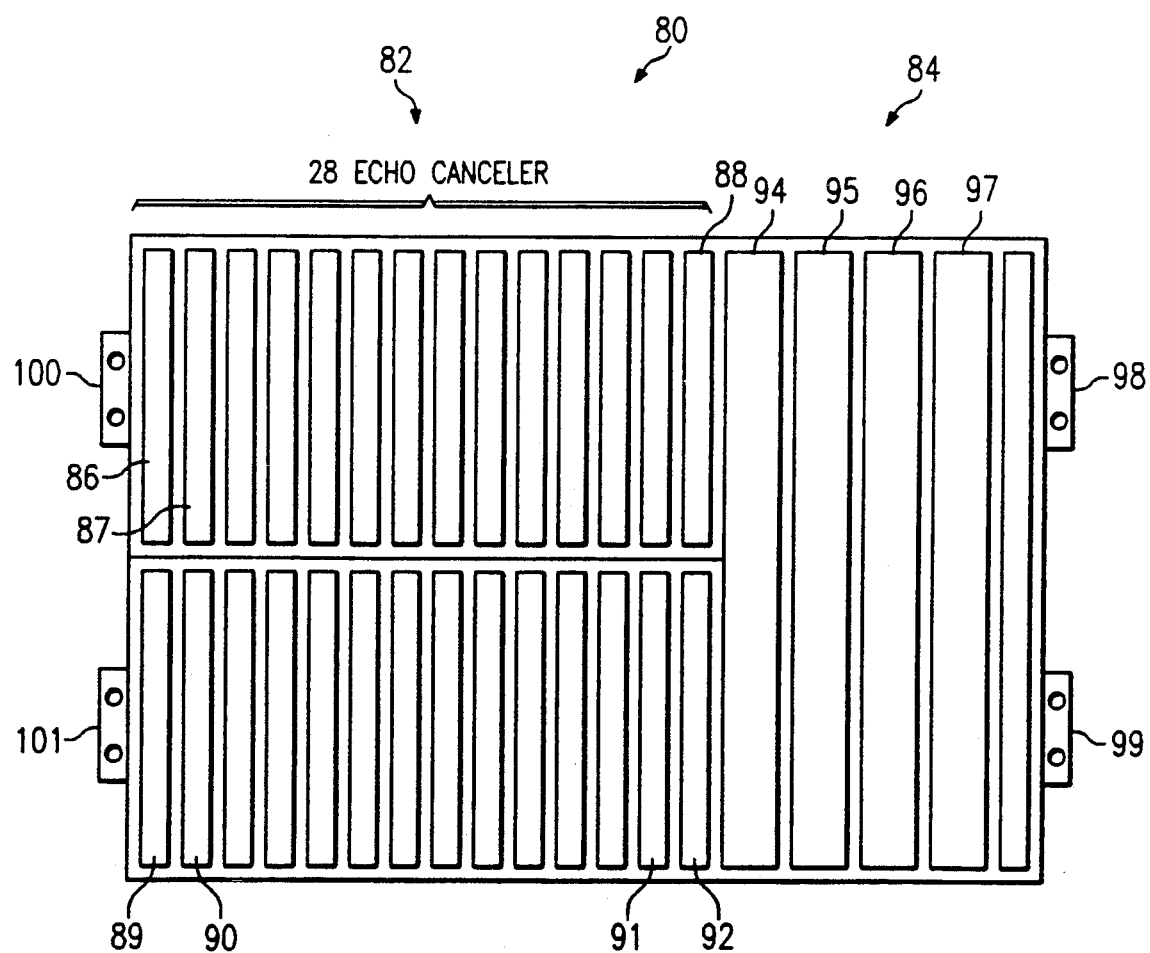
FIG. 4 is a frontal view of a shelf arrangement to accommodate the integrated echo canceling multiplexor of the present invention.

Referring to FIG. 4, a shelf arrangement 80 of the integrated echo canceling multiplexor is shown. 28 echo canceling printed circuit boards fashioned into cards 86-92 are pluggable into the echo canceling slots 82 of shelf 80. Four M13 multiplexing printed circuit cards 94-97 are accommodated in four slots 84 of shelf 80. Two of the multiplexing cards are primary DS!-DS3 interfaces 94 and 96, one for long haul and one for near. Two other multiplexing cards 95 and 97 serve as redundant backup interfaces. Shelf 80 is mountable in a bay (not shown) by fastening rack mounts 98-101 thereto. In the preferred embodiment of the present invention, four such shelves are accommodated in one bay.

Although the present invention has been described in detail, it should be understood that various changes, substitutions and alterations can be made hereto without departing from the spirit and scope of the present invention a defined by the appended claims.

What is claimed is:

1. An integrated echo canceling multiplexor, comprising:
    an echo canceling circuit for receiving DS1 signals for canceling echo in said DS1 signals and producing echo-free digital logic signals;
    a multiplex-demultiplexing circuit coupled to said echo canceling circuit for receiving said echo-free digital logic signals and producing DS3 signals; and
    a performance monitor integrally coupled to said echo canceling circuit and said multiplex-demultiplexing circuit for determining the quality of said echo-free DS1 digital logic signals and said produced DS3 signals.

2. The integrated echo canceling multiplexor, as set forth in claim 1, further comprising a third performance monitoring circuit integrally coupled to said echo canceling circuit for determining the quality of said DS1 signal at the DS0 level.

3. The integrated echo canceling multiplexor, as set forth in claim 3, wherein said performance monitor further determines the quality of said DS1 signal by computing the noise, signal power and echo levels for each DS0 channel.

4. The integrated echo canceling multiplexor, as set forth in claim 1, further comprising a second multiplex-demultiplexing circuit coupled to said echo canceling circuit for receiving DS3 signals and converting said DS3 signals to DS1 digital logic signals, and said echo canceling circuit receives said DS1 digital logic signals.

5. The integrated echo canceling multiplexor, as set forth in claim 4, further comprising a third performance monitoring circuit coupled to said second multiplex-demultiplexing circuit for receiving said DS1 digital logic signals and determining the quality of said DS1 signal.

6. The integrated echo canceling multiplexor, as set forth in claim 4, wherein said performance monitor further determines the quality of said DS3 signal received by said second multiplex-demultiplexing circuit.

7. An integrated echo canceling multiplexor, comprising:
    first multiplex-demultiplexing circuit for receiving DS3 signals and converting said DS3 signals to DS1 digital logic signals;
    an echo canceling circuit coupled to said first multiplex-demultiplexing circuit for receiving said DS1 digital logic signals and producing echo-free DS1 digital logic signals; and a second multiplex-demultiplexing circuit coupled to said echo canceling circuit for receiving said echo-free DS1 digital logic signals and producing DS3 signals for transmission.

8. The integrated echo canceling multiplexor, as set forth in claim 7, further comprising a performance monitoring circuit coupled to said first multiplex-demultiplexing circuit for receiving said DS1 digital logic signals and determining the quality of said DS1 signal.

9. The integrated echo canceling multiplexor, as set forth in claim 7, further comprising a performance monitoring circuit coupled to said echo canceling circuit for receiving said echo-free DS1 digital logic signal and determining the quality of said echo-free DS1 signal.

10. The integrated echo canceling multiplexor, as set forth in claim 7, further comprising a performance monitoring circuit integrally coupled to said first multiplex-demultiplexing circuit for determining the quality of said received DS3 signal.

11. The integrated echo canceling multiplexor, as set forth in claim 7, further comprising a performance monitoring circuit integrally coupled to said second multiplex-demultiplexing circuit for determining the quality of said produced DS3 signal.

12. The integrated echo canceling multiplexor, as set forth in claim 7, further comprising a performance monitoring circuit integrally coupled to said echo canceling circuit for determining the quality of said DS1 signal at the DS0 level.

13. The integrated echo canceling multiplexor, as set forth in claim 12, wherein said DS0 level performance monitoring circuit determines the quality of said DS1 signal by computing the noise and signal powers and echo level for each channel.

14. An integrated echo canceling multiplexor, comprising:
a first multiplex-demultiplexing circuit for receiving DS3 signals and converting said DS3 signals to DS1 digital logic signals;
an echo canceling circuit coupled to said first multiplex-demultiplexing circuit for receiving said DS1 digital logic signals and producing echo-free DS1 digital logic signals;
a second multiplex-demultiplexing circuit coupled to said echo canceling circuit for receiving said echo-free digital logic signals and producing DS3 signals for transmission;
a performance monitoring circuit coupled to said first multiplex-demultiplexing circuit for receiving said DS1 digital logic signals and determining the quality of said DS1 signal;
said performance monitoring circuit further coupled to said echo canceling circuit for receiving said echo-free DS1 digital logic signal and determining the quality of said echo-free DS1 signal;
said performance monitoring circuit integrally coupled to said first multiplex-demultiplexing circuit for determining the quality of said received DS3 signal;
said performance monitoring circuit further integrally coupled to said second multiplex-demultiplexing circuit for determining the quality of said produced DS3 signal; and
said performance monitoring circuit integrally coupled to said echo canceling circuit for determining the quality of said DS1 signal at the DS0 level.

15. The integrated echo canceling multiplexor, as set forth in claim 14, wherein said performance monitoring circuit determines the quality of said DS1 signal by computing the noise, signal power and echo levels for each DS0 channel.

16. A method for integrated echo canceling multiplexing, comprising the steps of:
receiving DS3 signals;
performance monitoring said received DS3 signals and determining the quality thereof;
multiplexing said received DS3 signals and converting said DS3 signals to DS1 digital logic signals;
performance monitoring said produced DS1 digital logic signals and determining the quality thereof;
echo canceling said DS1 digital logic signals and producing echo-free DS1 digital logic signals;
performance monitoring said echo-free DS1 digital logic signals and determining the quality thereof;
demultiplexing said echo-free digital logic signals and producing DS3 signals for transmission; and
performance monitoring said produced DS3 signals for determining the quality thereof.

* * * * *

UNITED STATES PATENT AND TRADEMARK OFFICE
CERTIFICATE OF CORRECTION

PATENT NO. : 5,148,426

DATED : September 15, 1992

INVENTOR(S) : Kishan Shenoi et al.

It is certified that error appears in the above-identified patent and that said Letters Patent is hereby corrected as shown below:

Column 2, line 29, after "FIG." insert -- 1 --.

Column 2, line 29, after "the" delete "DS!" and insert -- DS1 --.

Column 4, line 16, after "the" delete "DS!" and insert -- DS1 --.

Column 5, line 66, before "bipolar" delete "DS!" and insert -- DS1 --.

Column 6, line 9, after "primary" delete "DS!" and insert -- DS1 --.

Column 6, line 20, before "defined" delete "a" and insert -- as --.

Column 6, Claim 3, line 42, after "claim" delete "3" and insert -- 1 --.

Signed and Sealed this

Twenty-eighth Day of September, 1993

Attest:

BRUCE LEHMAN

*Attesting Officer*    *Commissioner of Patents and Trademarks*